Patented July 8, 1947

2,423,730

UNITED STATES PATENT OFFICE 2,423,730

ACYLAMINO PHENOLS

Ilmari F. Salminen and Arnold Weissberger, Rochester, N. Y., assignors to Eastman Kodak Company, Rochester, N. Y., a corporation of New Jersey No Drawing. Application June 8, 1944, Serial No. 539,397

7 Claims. (Cl. 260—559)

This invention relates to certain acylamino phenols and to their preparation.

It is an object of this invention to provide a method for obtaining valuable acylamino phenols. A further object is to provide compounds useful as couplers in color-forming processes of color photography.

These objects are accomplished by the provision of compounds having the following probable structure:

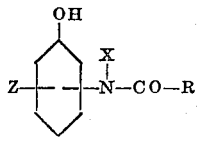

in which X is hydrogen or an alkyl group, such as methyl, ethyl, or propyl, R is a group including an alkoxy phenyl, phenoxy phenyl, or phenoxy alkyl group and Z is hydrogen or one or more substituent groups, such as halogen or hydrocarbon. The halogen substituents include chlorine, bromine, and iodine and the hydrocarbon substituents include alkyl groups, such as methyl, ethyl, propyl, butyl, and amyl, or aryl groups, such as phenyl. For the purposes of color photography, in which the compound reacts with the oxidation product of a p-phenylene diamine to produce indoaniline dyes, the position para to the hydroxyl should be unsubstituted with an irreplaceable group; that is, it should be unsubstituted, or substituted, or substituted only with a replaceable group, such as a halogen group. The acylamino group should be attached to the 2 or 3 position with respect to the hydroxyl group of the aromatic nucleus.

These compounds are prepared in general by replacement of one of the hydrogen atoms of the amine group of the amino phenol by an acyl group.

The following compounds are illustrative of our invention:

1. 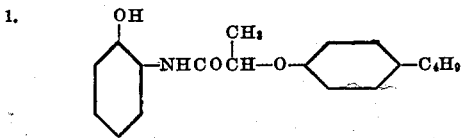

2. 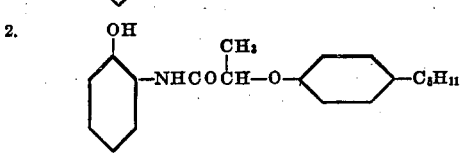

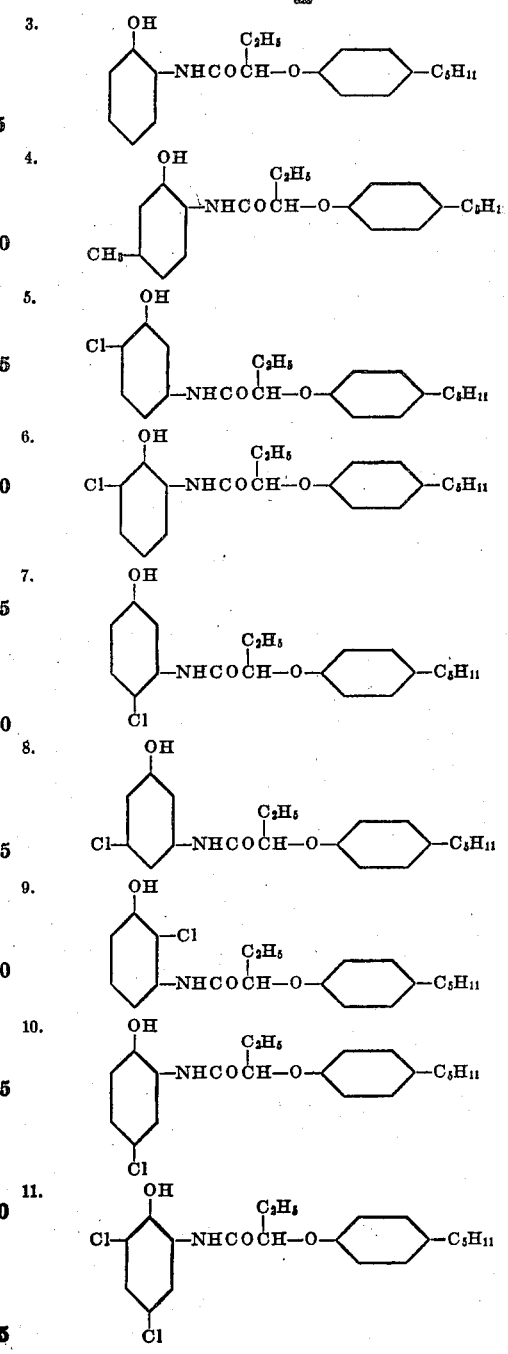

2,423,730
3
12. 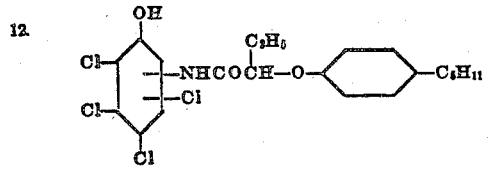
13. 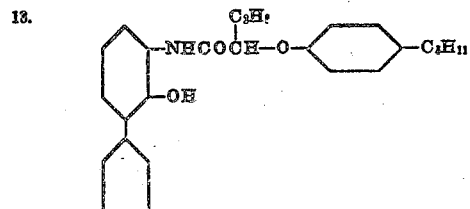
14. 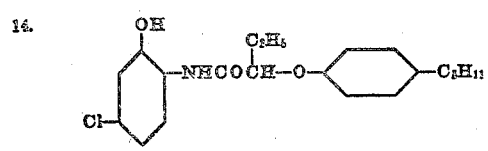
15. 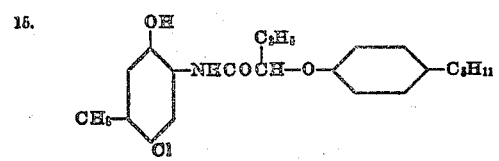
16. 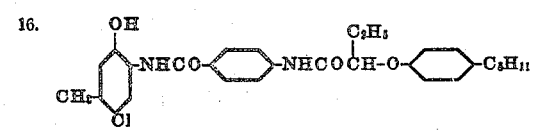
17. 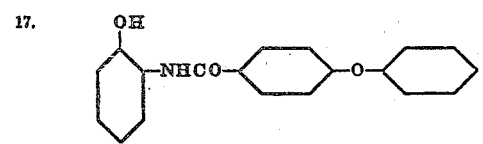
18. 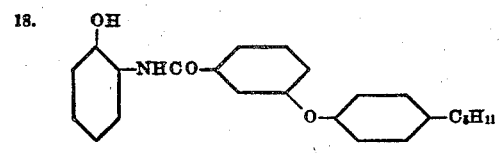
19. 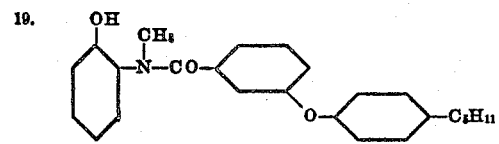
20. 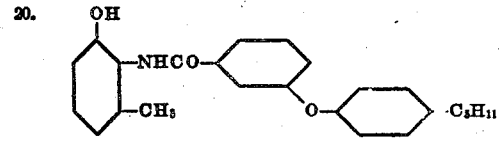
21. 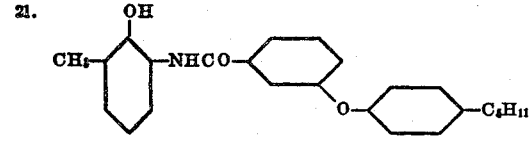
22. 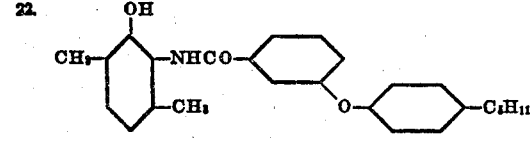
4
23. 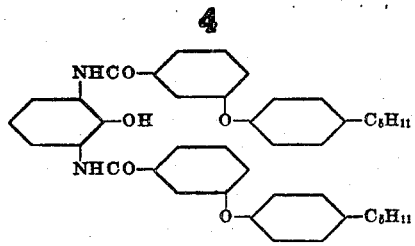
24. 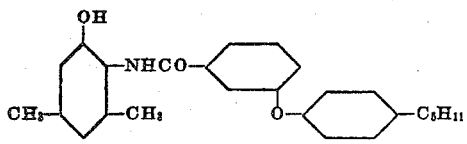
25. 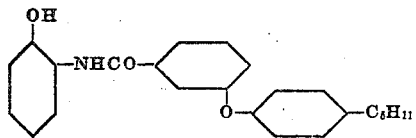
26. 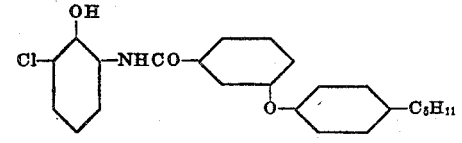
27. 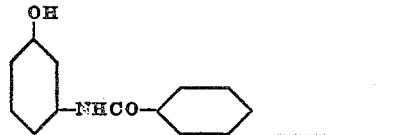
28. 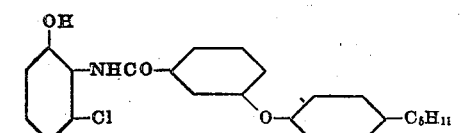
29. 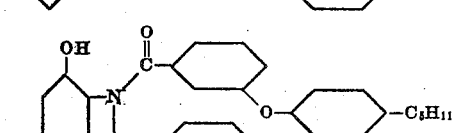
30. 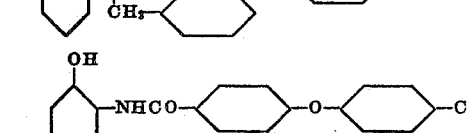
31. 
32. 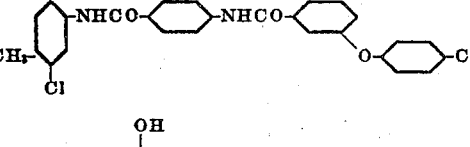
33. 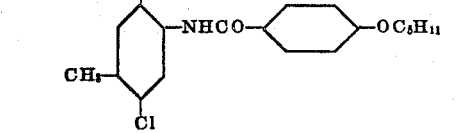

Our compounds may be prepared by heating a suitable amino phenol with a suitable acyl chloride in a solvent, such as toluene. The resulting acylamino phenol is separated from the reaction mixture by filtration and is then dried, recrystallized and separated.

As a specific illustration of the method of preparing our compounds, 2-[α-(4'-tert.-amylphenoxy) - n - butyrylamino]- 5 -methyl-1-phenol is produced as follows:

*2-[α-(4'-tert.-amylphenoxy)-n-butyrylamino]-5-methyl - 1 - phenol.*—In a 1–1 three-necked flask provided with a stirrer, thermometer and reflux condenser is placed 24.6 g. (0.2 mole) of 5-methyl-2-amino phenol and 250 cc. of toluene. To this mixture is added 28 g. (0.105 mole) of α-(p-tert.-amylphenoxy)-n-butyryl chloride with stirring. The temperature of the mixture rises from 20–27° C. The mixture is heated at a boil for 5 minutes and filtered by suction while hot. The residue of 5-methyl-2-amino phenol hydrochloride is washed on the filter with 25 cc. of toluene. Of this hydrochloride, 14 g. is recovered.

The cooled toluene filtrate is washed successively with 200 cc. of 3% hydrochloric acid, 200 cc. of water, 200 cc. of 3% sodium bicarbonate solution, 200 cc. of water. The toluene solution is dried over anhydrous calcium chloride, treated with 1 g. of Darco (decolorizing carbon marketed by Darco Sales Corporation, 60 East 42nd Street, New York, N. Y.) and filtered by suction through a layer of 1 g. of Darco. The colorless filtrate is diluted with 500 cc. of ligroin. The 2-[α-(4'-tert.-amylphenoxy)-n-butyrylamine]- 5 - methyl phenol which crystallizes is filtered and washed on the filter with 100 cc. of petroleum ether. Yield: 26 g. (73%), M. P. 109–110° C.

The α-(p-tert.-amylphenoxy)-n-butyryl chloride used in this procedure is prepared as follows:

One mole of sodium hydroxide as a 40% aqueous solution is stirred into one mole of p-tert.-amylphenol at 110° C. to this hot mixture is added ½ mole of α-bromobutyric acid as rapidly as possible. The mixture is then heated at a boil for 3 hours under a reflux condenser. The hot liquid is cooled and diluted with water and benzene. The mixture is acidified with excess mineral acid, such as hydrochloric acid and the benzene layer containing 2-p-tert.-amylphenol and p-tert.-amylphenoxy-n-butyric acid is distilled in vacuo, the p-tert.-amylphenoxy-n-butyric acid being collected at 168–173° C. and 3 mm. pressure.

The acyl chloride is formed by treating 150 g. of p-tert.-amylphenoxy-n-butyric acid with 375 g. of thionyl chloride.

The p-tert.-butylphenoxy propionic acid and p-tert.-amylphenoxy propionic acid used in the preparation of compounds 1 and 2 are produced as follows:

*p-Tert.-butylphenoxy propionic acid.*—One mole of sodium hydroxide in absolute ethyl alcohol is added to an absolute ethyl alcohol solution of one mole of α-chlor propionic acid. This solution is added to one obtained by dissolving one mole of sodium, then one mole of p-tert.-butyl phenol in absolute ethyl alcohol. The resulting solution is heated at a boil for 20 hours under a reflux condenser. Alcohol is removed by distillation. The residual sodium salts are mixed with ether and acidified with excess hydrochloric acid. The ethereal extract of p-tert.-butylphenoxy propionic acid is washed with water, dried over magnesium sulfate and concentrated at room temperature under reduced pressure. The product crystallizes.

*p-Tert.-amylphenoxy propionic acid.*—One mole each of α-chlor propionic acid and tert.-amylphenol is dissolved by heating on a steam bath in a 25% (by weight) aqueous solution of two moles of sodium hydroxide. After 4 hours of heating on the steam bath, the mixture which has resulted is diluted with water and acidified with an excess of mineral acid. The oily products which separate are removed from the water by extraction with benzene. The benzene solution is distilled fractionally in vacuo, p-tert.-amylphenoxy propionic acid being collected at 165–169°/2 mm.

Compounds 18 to 29, 31 and 32 were prepared with tertiary amyl-m-phenoxybenzoyl chloride as the acyl halide. This intermediate is prepared by heating a well-stirred mixture of one mole of m-bromo benzoic acid, four moles of p-tert.-amylphenol, 25 moles of granular sodium hydroxide and two grams of copper bronze powder at the boiling point under a reflux condenser for 3 hours. The molten mass is then poured into an aqueous solution containing an excess of sodium carbonate. Excess p-tert.-amylphenol is extracted from the alkaline mixture with ethyl ether, and the alkaline aqueous portion containing sodium p-tert.-amyl-m-phenoxy benzoate is acidified with mineral acid and the precipitated product isolated by filtration and extracted with ether. The acyl chloride was formed by treatment with thionyl chloride as described above.

Compounds 16 and 32 employ the same acyl halides already described but the amino phenols are first reached with p-nitro benzoyl chloride. The resulting nitro compound is then reduced and the amino derivative reached with the acyl halides. Compound 16 is prepared by condensation of the amine and acyl halide in dioxane and quinoline. Compound 32 is prepared in acetic acid and sodium acetate.

The p-amyloxybenzoyl chloride used in the preparation of compound 33 is produced as follows:

*p-n-Amyloxybenzoic acid*

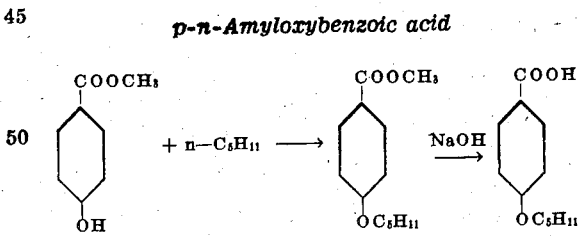

To 69 g. (3.0 moles) of sodium dissolved in 1600 cc. of methyl alcohol was added 456 g. (3.0 moles) of methyl p-hydroxybenzoate and 594 g. (3.0 moles) of n-amyl iodide. The reaction mixture was refluxed on a steam bath for 24 hours and was then vacuum concentrated to about one-half its volume, and made up to 5 l. with cold water. The ester was extracted with 1.5 to 2 l. of ethyl ether, the ethereal solution was washed with water, 500 cc. of benzene was added, and the solution was vacuum concentrated to remove all solvent. The residual ester was hydrolyzed with 2 l. of 10% sodium hydroxide and 1100 cc. of ethyl alcohol by heating on a steam bath for 2 hours. The reaction mixture was cooled and acidified to Congo red with hydrochloric acid. On cooling, the acid crystallized and was filtered off and washed with water. It was then dried in the steam cabinet. Yield 476 g. (75%). The product melts at 118° (122°) solidifies and melts again at 148°.

p-n-Amyloxybenzoyl chloride

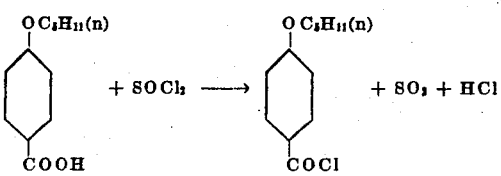

A mixture of 500 g. (2.4 moles) of p-n-amyloxybenzoic acid (M. P. 118–120°) and 1146 g. (9.62 moles) of thionyl chloride was warmed in a 3-1 flask for 45 minutes at 35–45° on a steam bath. The evolution of sulfur dioxide was brisk but the reaction was easily controlled. At the end of this period, evolution of sulfur dioxide was gentle. Excess thionyl chloride was distilled initially on a steam bath by reduced pressure at the water pump. Final traces of thionyl chloride were removed by heating the dark gray liquid while still under reduced pressure at the water pump to a maximum temperature of 150° C. The p-n-amyloxybenzoyl chloride was first distilled rapidly at a pressure of 3–5 mm. and then refined as a water-white liquid by redistillation. B. P. 138–140°/3 mm. Yield 498 g. (92%).

The 2- and 3-amino phenols used in the preparation of our acylamino phenols are generally readily available or can be prepared by known methods. Typical procedures are as follows:

4-chloro-2-aminophenol is prepared by nitrating chlorophenol at room temperature with dilute nitric acid. Fifty parts of nitric acid are diluted with 75 parts of water, and to the dilute nitric acid are added 5 parts of molten para-chlorophenol. The nitro compound is recrystallized from dilute alcohol. An alcoholic solution of 4-chloro-2-nitrophenol is then reduced at room temperature by catalytic hydrogenation with Raney nickel catalyst. The reduced solution is filtered and the amino phenol precipitated as the hydrochloride by introduction of HCl. The 4-chloro-2-aminophenol is liberated from the hydrochloride by aqueous sodium bicarbonate.

6-chloro-2-amino phenol is prepared by introducing a solution of equal volumes of concentrated nitric acid (65–67% HNO3) and water to a benzene solution of 2-chlorophenol. Benzene is removed by distillation and 6-chloro-2-nitrophenol isolated by steam distillation of the residue. The 6-chloro-2-nitrophenol is dissolved in dioxane or alcohol and reduced catalytically at room temperature in an atmosphere of hydrogen using Raney nickel catalyst. From the reduced filtered solution, 6-chloro-2-aminophenol is obtained by evaporation of the solvent.

Compounds 11 and 12 were prepared as follows:

2,4-dichloro phenol is nitrated with fuming nitric acid at 28–30°, giving 2,4-dichloro 6-nitro phenol. The dichlor nitro phenol is reduced catalytically to 2,4-dichloro-6-amino phenol Raney nickel being used as catalyst. The dichloro amino phenol is condensed with the acyl halide in ether, two equivalents of amine being used.

Compound 12 was prepared by the action of excess sulfuryl chloride on compound 3 at 38–45° for 20 minutes. The tetra-chlor compound was precipitated with petroleum ether and recrystallized from a mixture of ether and petroleum ether.

Compound 19 was prepared from 2-methylaminophenol in the usual way.

Compound 23 was prepared from 2,6-diamino phenol hydrochloride and the acyl halide in acetic acid and sodium acetate.

Compound 29 was prepared from o-benzylamino phenol and the acyl halide in ether, two equivalents of the amino phenol being used. o-Benzylamino phenol was prepared by the action of benzaldehyde on o-amino phenol in ethyl alcohol and catalytic reduction of the Schiff base so formed. Raney nickel was used as the catalyst.

The compounds of our invention are useful in the production of indoaniline dyes, since they possess an active position para to the hydroxyl group which is believed to react with the oxidation product of p-phenylene diamine or dialkyl p-phenylene diamines. The compounds may be used in photographic developing solution or emulsion layers for purposes of color photography, and such use is described in Salminen, Vittum and Weissberger U. S. patent application Serial No. 446,777, filed June 12, 1942, now U. S. Patent 2,367,531, granted January 16, 1945.

It will be understood that the examples and compounds included herein are illustrative only and that our invention is to be taken as limited only by the scope of the appended claims.

We claim:

1. A compound having the formula:

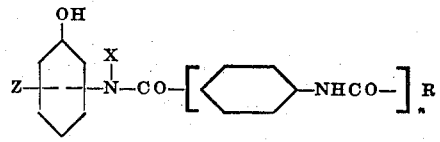

where X is selected from the class consisting of hydrogen and alkyl groups, R is selected from the class consisting of alkoxyphenyl, phenoxyphenyl, alkylphenoxyphenyl, phenoxyalkyl and alkylphenoxyalkyl groups, $n$ is selected from the group consisting of 0 and 1, Z is selected from the class consisting of hydrogen, halogen and hydrocarbon, the hydrocarbon is attached to the phenol nucleus in a position selected from the class consisting of 5- and 6-positions with respect to the hydroxyl group and the nitrogen atom is attached to the phenol nucleus in a position selected from the class consisting of 2- and 3-positions with respect to the hydroxyl group.

2. A compound having the formula:

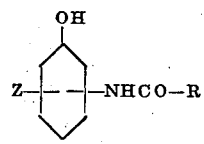

where R is alkylphenoxyalkyl, Z is halogen and the nitrogen atom is attached to the phenol nucleus in a position other than para with respect to the hydroxyl group.

3. A compound having the formula:

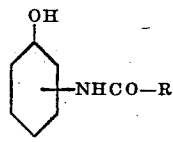

where R is alkylphenoxyphenyl and the nitrogen atom is attached to the phenol nucleus in a position other than para with respect to the hydroxyl group.

4. A compound having the formula:

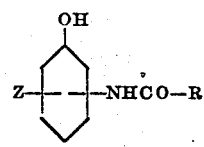

where R is alkylphenoxyphenyl, Z is a hydrocarbon radical and Z and the nitrogen atom are attached to the phenol nucleus in a position other than para with respect to the hydroxyl group.

5. A compound having the formula:

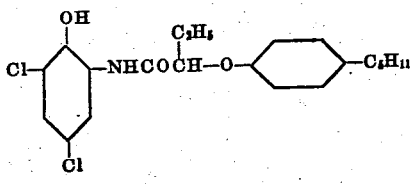

6. A compound having the formula:

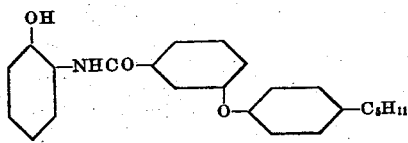

7. A compound having the formula:

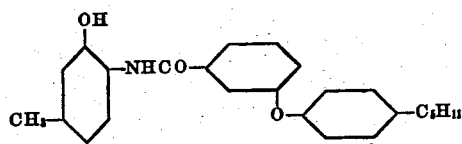

ILMARI F. SALMINEN.
ARNOLD WEISSBERGER.

REFERENCES CITED

The following references are of record in the file of this patent:

UNITED STATES PATENTS

| Number | Name | Date |
| --- | --- | --- |
| 2,179,234 | Schneider | Nov. 7, 1939 |
| 2,179,239 | Wilmanns et al. | Nov. 7, 1939 |
| 2,181,944 | Kleine | Dec. 5, 1939 |
| 2,324,832 | Frohlich | July 20, 1943 |
| 2,083,962 | Petitcolas | June 15, 1937 |

FOREIGN PATENTS

| Number | Country | Date |
| --- | --- | --- |
| 158,239 | Switzerland | Nov. 15, 1932 |